3,342,780
REACTION PRODUCT OF A DIBASIC POLYCAR-
BOXYLIC ACID AND TRIS (2-HYDROXYETHYL)
ISOCYANURATE
John F. Meyer, Schenectady, and Edmund J. Zalewski,
Rotterdam, N.Y., assignors to Schenectady Chemicals
Inc., Schenectady, N.Y., a corporation of New York
No Drawing. Filed June 16, 1961, Ser. No. 117,499
12 Claims. (Cl. 260—75)

This invention relates to esters of tris (2-hydroxyethyl) isocyanurate and electrical conductors coated therewith.

It is an object of the present invention to prepare novel esters of tris (2-hydroxyethyl) isocyanurate.

Another object is to provide improved polyester coatings for electrical conductors.

A further object is to provide wire enamels which exhibit exceptionally good resistance to heat aging.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting tris (2-hydroxyethyl) isocyanurate with terephthalic acid or isophthalic acid or an ester forming derivative of such acids. Tris (2-hydroxyethyl) isocyanurate has the formula

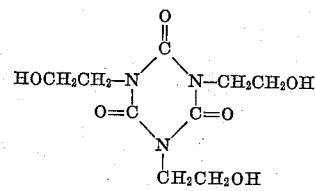

The tris (2-hydroxyethyl) isocyanurate can be employed as the sole polyhydric alcohol or it can be replaced in part by one or more other polyhydric alcohols. While as little as 10% of the total polyhydric alcohol can be the tris (2-hydroxyethyl) isocyanurate, preferably at least 50% of the total polyhydric alcohol is the isocanyurate on a weight basis.

On an equivalent percent basis preferably at least 25% of the total polyhydric alcohol is the tris (2-hydroxyethyl) isocyanurate.

In making the polyester usually 15 to 46 equivalent percent is the carboxylic acid reactant and the balance is the polyhydric alcohol; i.e., there should be an excess of alcoholic groups over acid groups.

All of the polycarboxylic acid constituent can be the terephthalic acid or isophthalic acid or a portion up to 80 equivalent percent based on a total of 100 equivalent percent of the acid constituent can be a different acid. Preferably at least 50 equivalent percent of the acid component is terephthalic acid. The term equivalent percent is conventionally employed in the art since the alcohol and acid components react on an equivalent rather than a molar basis. The term equivalent percent is defined for example in Sheffer Patent No. 2,889,304 and Precopio Patent No. 2,936,296.

When a modifying polyhydric alcohol is employed it can be ethylene glycol; glycerine; pentaerythritol; 1,1,1-trimethylolethane; 1,1,1 - trimethylolpropane; sorbitol; mannitol; dipentaerythritol; α,ω-aliphatic hydrocarbon diols having 4 to 5 carbon atoms, e.g., butanediol 1,4; pentanediol 1,5; butene 2-diol 1,4; and butyne-2-diol 1,4 and cyclic glycols, e.g., 2,2,4,4-tetramethyl-1,3-cyclobutanediol, hydroquinone di beta hydroxyethyl ether and 1,4-cyclohexanedimethanol.

As the acid reactant there is employed terephthalic acid or isophthalic acid or acyl halides thereof, e.g., terephthaloyl dichloride or a lower dialkyl ester thereof, e.g., methyl, ethyl, propyl, butyl, amyl, hexyl and octyl terephthalates and the corresponding isophthalates as well as the half esters, e.g., monomethyl terephthalate as well as mixtures of such esters and acids or acid halides. Preferably dimethyl terephthalate is employed:

When a modifying polycarboxylic acid is employed it can be either aliphatic or aromatic. Typical examples are adipic acid, ortho phthalic anhydride, hemimellitic acid, trimesic acid, trimellitic acid, succinic acid, tetrachloro phthalic anhydride, hexachloroendomethylene tetrahydrophthalic acid, maleic acid, sebacic acid, etc.

To improve abrasion properties of the wire enamel small amounts of metal driers are employed.

While the new polyesters are preferably employed in making wire enamels they are also useful in making molded products and in solution can be used to impregnate cloth, paper, asbestos and the like. They can be employed in general wherever alkyl resins are useful.

The total number of hydroxyl groups on the alcohols normally is 1 to 1.6 times the total number of carboxyl groups on the acids.

It has further been found that the properties of the polyester can be improved by the addition of a polyisocyanate in an amount of 10–40%, preferably 15 to 25% by weight of the total of the polyisocyanate and polyester. Preferably, the polyisocyanate has at least three available isocyanate groups.

Among the polyisocyanates which can be employed there may be mentioned diisocyanates such as 2,4-tolylene diisocyanate, 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, dianisidine diisocyanate, 4,4'-diphenyl ether diisocyanate, 4,4'4"-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

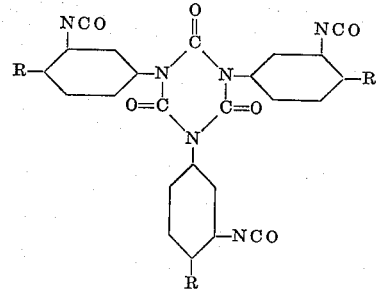

where R is a lower alkyl radical, e.g., n-butyl, tertiary butyl, secondary butyl, isopropyl, methyl, ethyl, etc., 1,3,5-triisocyanato benzene, 2,4,6-triisocyanato toluene, 4,4'-dimethyl-diphenylmethane, 2,2',5,5'-tetraisocyanate, 2,4,4'-triisocyanato diphenylmethane, 2,4,6-triisocyanato diphenyl ether, 2,2',4-triisocyanato diphenyl ether, 2,2'4-triisocyanato diphenyl sulfide, 2,4,4'-triisocyanato diphenyl sulfide, 2,3',4-triisocyanato-4'-methyl diphenyl ether, 2,3',4-triisocyanato-4'-methoxydiphenyl ether, 2,4, 4'-triisocyanato-3'-chlorodiphenyl ether, 2,4,4'-triisocyanato-3',5'-dimethyl diphenyl ether, 4,4',6-diphenyl triisocyanate, 1,2,4-butanetriol triisocyanate, 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g., by forming carbamates therewith, are monohydric phenols, such as phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro-phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g., hydroxyethylcarbamic acid phenyl ester, hydroxyethylcarbamic acid cresyl ester, diethyl malonite, mercaptans, e.g., 2-mercaptobenzothiazole, 2-mercaptothiazoline, dodecyl mercaptan, ethyl 2-mercaptothiazole, p-naphthyl mercaptan, α-naphthyl mercaptan, methyl mercaptan, butyl mercaptan, lactams, e.g., ε-caprolactam, Δ-valerolactam, γ-butyrolactam, β-propiolactam, imides, e.g., succinimide, phthalimide, naphthalimide, glutarimide, dimethylphenyl varbinol, secondary amines, e.g., o-ditolylamine, m-ditolylamine, p-ditolylamine, N-phenyl toluidine, phenyl-α-naphthylamine, carbazole, diphenylamine, etc. mono-α-phenylethyl phenol, di-α-phenylethyl phenol, tri-α-phenylethyl phenol, carvacrol, thymol, methyl diphenyl carbinol, triphenyl carbinol, 1-nitro tertiary butyl carbinol, 1-chloro-tertiary butyl carbinol, triphenyl silanol, 2,2′-dinitrodiphenyl-amine, 2,2′-dichlorodiphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur SH, wherein the isocyanato groups of the reaction product of 3 mols of mixed 2,4- and 2,6-tolylene diisocyanate with trimethylol propane are blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or aceto-acetic acid ester or phenol or cresylic acid or ε-caprolactam or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650 to 800° F.

The metal drier is preferably used in an amount of 0.2 to 1.0% metal based on the total solids in the enamel. Typical metal driers include the zinc, lead, calcium or cadmium linoleates, octoates, and resinates of each of these metals, e.g., zinc resinate, cacmium resinate, lead linoleate, calcium linoleate, zinc naphthenate, lead naphthenate, calcium naphthenate, cadmium naphthenate, zinc octoate and cadmium octoate. Other suitable metal drier, specifically polyvalent metal driers such as manganese naphthenate and cobalt naphthenate can be employed.

It has further been found that the properties of the polyester wire enamel can be improved by incorporating a tetra alkyl titanate in place of the metal drier and polyisocyanate. Typical tetra alkyl titanates are tetraisopropyl titanate, tetrabutyl titanate, tetrahexyl titanate, tetramethyl titanate and tetrapropyl titanate. The titanate is used in small amounts, e.g., 0.001 to 4.0% titanium metal on the total solids of the enamel.

The use of tris(2-hydroxyethyl)isocyanurate gives wire enamels which exhibit exceptionally good resistance to heat aging as shown by experiments carried out at 240° C.

The solvent employed in making the wire enamel is cresylic acid. Cresylic acid has a boiling range of 185 to 230° C. and is a mixture of o-, m-, and p-cresols. The individual cresols, e.g., para cresol, meta cresol or ortho cresol can be employed although it is preferred to use the commercial cresylic acid mixture.

It is frequently desirable to dilute the cresylic acid with an aromatic hydrocarbon, e.g., a heavy coal tar or petroleum naphtha or with xylene, etc. The naphtha can be employed in an amount of from 0 to 60%, e.g., 5 to 60%, based on the total weight of the solvents; preferably the naphtha. Various conventional aromatic naphthas, especially high boiling naphthas, can be employed such as EW naphtha (an enamel wire heavy coal tar naphtha sold by the Barrett Division of Allied Chemical and Dye Corporation) and Solvesso No. 100, an aromatic naphtha derived from petroleum.

The temperature of reaction is not especially critical and temperatures conventionally employed in preparing known glycerine or ethylene glycol esters of terephthalic acid are used, e.g., 80° C. to reflux temperature.

The wire enamel is applied to the wire, e.g., copper wire, by either the "free dip" or the die application procedure. In the following specific examples the die application procedure was employed to obtain a build up of approximately 3 mils on #18 A.W.G. copper wire.

The tests employed on the coated wire for the most part are described in Precopio Patent 2,936,296 and are conventional in the wire enamel art. The high temperature dielectric twist aging test was carried out at 240° C. rather than under the less severe conditions set forth in the Precopio patent.

Unless otherwise stated, all parts and percentages are by weight.

*Example 1*

| | |
|---|---|
| Ethylene glycol, grams | 147 |
| Glycerine, grams | 97 |
| 1,4-butanediol, grams | 74 |
| Tris (2-hydroxyethyl) isocyanurate, grams | 608 |
| Dimethyl terephthalate, grams | 1164 |
| Litharge (catalyst), grams | 0.3 |
| Solvesso 100, ml. | 224 |
| Xylol, ml. | 100 |

The above mixture was reacted at a temperature of 430–435° F. until a hydroxyl value of 154.5 was reached. The product was then reduced to 50.6% solids with cresylic acid to produce product A.

A wire enamel was prepared by mixing 718 grams of product A, 116 grams of Mondur SH, 371 grams of cresylic acid, 391 grams of Solvesso 100 and 25.3 grams of 9% zinc octoate in E.W. naphtha. The wire enamel thus produced was applied on 18 gauge copper wire and produced an enamel which exhibited the following properties:

|  | Wire Speed, ft./min. | |
| --- | --- | --- |
|  | 27 | 32 |
| Cut Through, °C | 272–308 | 260–310 |
| Heat Shock 175° C., 1 x–2 x–3 x | 100–100–100 | 20–90–100 |
| Dielectric Twist Heat Aging, 1,000 volts at 240° C., hrs | 1,600 | 1,088 |

*Example 2*

| | |
| --- | --- |
| 2,2,4,4-tetramethyl 1,3-cyclobutanediol, grams | 119.6 |
| Tris (2-hydroxyethyl) isocyanurate, grams | 511 |
| Ethylene glycol, grams | 129 |
| Glycerine, grams | 128 |
| Dimethyl terephthalate, grams | 1112.8 |
| Litharge, grams | 0.4 |
| Xylol, ml. | 86 |
| Solvesso 100, ml. | 258 |

This mixture was reacted using an azeotropic distillation at a temperature of 490–500° F. until a hydroxyl value of 136 was reached. The batch was then reduced to 50.9% solids with cresylic acid to produce product B.

A wire enamel was then made from 812 grams of product B, 116 grams of Mondur SH, 402 grams of cresylic acid, 432 grams of Solvesso 100 and 29.4 grams of 9% zinc octoate in E.W. naphtha. The wire enamel produced the following properties on 18 gauge copper wire.

|  | Wire Speed, ft./min. | |
| --- | --- | --- |
|  | 27 | 32 |
| Cut Through, °C | 320–330 | 320–300 |
| Heat Shock at 175° C., 1 x–2 x–3 x | 100–100–100 | 70–100–100 |
| Dielectric Twist Heat Aging at 240° C | (1) | (2) |

¹ In excess of 2,000 hrs.
² In excess of 1,700 hrs.

*Example 3*

The process of Example 1 was repeated but the heating at 430–435° F. was continued until the hydroxyl value was 124. This product was reduced to 51% solids with cresylic acid and labeled product C.

1000 grams of product C, 458 grams of Solvesso 100 and 20.4 grams of tetra isopropyl titanate wire made up as a wire enamel and coated on 18 gauge copper wire. The cut through temperature was 355–360° C. at wire speeds of from 27 feet/min. to 32 feet/min.

*Example 4*

| | |
| --- | --- |
| Tris (2-hydroxyethyl) isocyanurate, grams (4 moles) | 1044 |
| Dimethyl terephthalate, grams (4 moles) | 776 |
| Xylol, ml. | 100 |
| Solvesso 100, ml. | 200 |
| Tetraisopropyl titanate, grams | 3.6 |

The above mixture was charged into a 3 liter reaction kettle equipped with a distillation condenser, stirrer and thermometer. The temperature was raised slowly over the course of 6 hours until 365° F. was reached. At this time the batch was reduced with cresylic acids to a solids content of 73.9%. To 1000 grams of the above material was added 848 grams of cresylic acid, 615 grams of Solvesso 100 and 29.5 grams of tetraisopropyl titanate. The resulting enamel had a viscosity of H–I (Gardner-Holdt scale) and a solids content of approximately 30%. When run on #18 AWG copper wire through a commercial wire enameling tower enameled wire was produced which was eminently satisfactory for commercial use. Abrasion resistance measured on a General Electric Scrape Abrasion Tester was 57 strokes; flexibility was satisfactory; cut through temperature was 385–390° C.; heat shock at 175° C. 1×mandrel 60% pass, 2×mandrel 100% pass, 3×mandrel 100% pass. AIEE No. 57 heat life tests indicated that the enamel had at least a class B rating.

*Example 5*

| | |
| --- | --- |
| Tris (2-hydroxyethyl) isocyanurate, grams | 992 |
| Ethylene glycol, grams | 88 |
| Dimethyl terephthalate, grams | 920 |
| Litharge, grams | 0.3 |
| Xylol, ml. | 100 |
| Solvesso 100, ml. | 200 |

The above mixture was charged into the same reaction vessel as that used in Example 4. The batch was slowly heated during 8 hours until a temperature of 440° F. was attained. Cresylic acid was then added to yield a solids content of 67.2%. 1000 grams of the above material were mixed with 680 grams of cresylic acid, 1008 grams of Solvesso 100 and 26.9 grams of tetraisopropyl titanate. The resulting enamel had a viscosity of C (Gardner-Holdt) and a solids content of 25%. When run on #18 AWG copper wire the enameled wire obtained was typical of good commercial wire. The scrape was above 30; flexibility was satisfactory; cut through was in the range of 385–395° C.; heat shock at 175° C. 1× mandrel 80% pass, 2× mandrel 100% pass, 3× mandrel 100%. AIEE No. 57 heat life tests indicated that the material would be at least a class B enamel.

*Example 6*

| | |
| --- | --- |
| Tris (2-hydroxyethyl) isocyanurate, grams | 556 |
| Dimethyl terephthalate, grams | 413 |
| Adipic acid, grams | 31 |
| Litharge, grams | 0.15 |
| Xylol, ml. | 50 |
| Solvesso 100, ml. | 100 |

The above mixture was charged into the reaction vessel. The batch was slowly heated over the course of 8 hours until a temperature of 465° F. was reached. At this time the batch was reduced with cresylic acid until a solid content of 50.5% was obtained. To 1000 grams of the above material were added 262 grams of cresylic acid and 758 grams of Solvesso 100 and 20.2 grams of tetraisopropyl titanate. The wire enamel obtained had a viscosity of A (Gardner-Holdt) and a solids content of 25%. When run on #18 AWG copper wire in a wire enameling tower, commercially acceptable wire was obtained.

What is claimed is:

1. A polymeric ester of a polycarboxylic acid of the group consisting of terephthalic acid and isophthalic acid and tris (2-hydroxyethyl) isocyanurate.

2. A polymeric ester according to claim 1 wherein said polycarboxylic acid is terephthalic acid.

3. A polymeric ester according to claim 2 wherein a portion of the terephthalic acid up to 80 equivalent percent of the total acid is replaced by another polycarboxylic acid.

4. A polymeric ester according to claim 3 wherein a portion of the terephthalic acid up to 50 equivalent percent of the total acid is replaced by another polycarboxylic acid.

5. A polymeric ester according to claim 1 wherein a portion of the tris (2-hydroxyethyl) isocyanurate up to 90% equivalent percent of the total polyhydric alcohol is replaced by another polyhydric alcohol.

6. A polymeric ester according to claim 5 wherein a portion of the tris (2-hydroxyethyl) isocyanurate up to 50 equivalent percent of the total polyhydric alcohol is replaced by another polyhydric alcohol.

7. A composition including the polymeric ester of claim 1 and 10 to 40% of an organic polyisocyanate.

8. A composition including the polymeric ester of claim 1 and 0.001 to 4.0% of an alkyl titanate.

9. A polymeric ester according to claim 1 wherein the total number of hydroxyl groups on the alcohols is from 1 to 1.6 times the total number of carboxyl groups on the acids.

10. A polymeric ester consisting of the reaction product of terephthalic acid and tris (2-hydroxyethyl) isocyanurate.

11. A polymeric ester consisting essentially of the polymeric ester of a polycarboxylic acid of the group consisting of terephthalic acid and isophthalic acid and mixtures of such an acid with up to 80 equivalent percent of another polycarboxylic acid and an alcohol selected from the group consisting of tris (2-hydroxyethyl) isocyanurate and mixtures of such isocyanurate with up to 90 equivalent percent of the total polyhydric alcohol of another polyhydric alcohol, the total number of hydroxyl groups on the alcohol reactant being from 1 to 1.6 times the total number of carboxylic groups of the acid.

12. A polymeric ester consisting essentially of the polymeric ester of terephthalic acid and a mixture of alcohols consisting of tris (2-hydroxyethyl) isocyanurate, an alkane diol having 2–5 carbon atoms and glycerine, the isocyanurate being at least 50 equivalent percent of the total alcohols, and the total number of hydroxyl groups on the alcohol reactant being from 1 to 1.6 times the total number of carboxyl groups of the acid reactant.

References Cited

UNITED STATES PATENTS

| | | | |
|---|---|---|---|
| 2,889,304 | 6/1959 | Sheffer et al. | 260—75 |
| 2,936,296 | 5/1960 | Precopio et al. | 260—75 |
| 2,982,754 | 5/1961 | Sheffer et al. | 260—75 |
| 3,184,438 | 5/1965 | Phillips et al. | 260—75 |
| 3,200,119 | 8/1965 | Hopkins | 260—75 |
| 3,211,585 | 10/1965 | Meyer et al. | 260—75 |
| 3,215,758 | 11/1965 | Hopkins | 260—75 |
| 3,235,553 | 2/1966 | Sadle | 260—75 |
| 3,279,940 | 10/1966 | Francis et al. | 117—94 |

OTHER REFERENCES

Dudley et al.: Journal of the Amer. Chem. Soc., vol. 73, page 2999 (1951).

Frazer et al.: Journal of Organic Chem., vol. 25, pages 1944–6 (1960).

DONALD E. CZAJA, *Primary Examiner.*

L. J. BERCOVITZ, *Examiner.*

J. J. KLOCKO, G. W. RAUCHFUSS, JR.,
*Assistant Examiners.*

UNITED STATES PATENT OFFICE
CERTIFICATE OF CORRECTION

Patent No. 3,342,780                                               September 19, 1967

John F. Meyer et al.

It is hereby certified that error appears in the above numbered patent requiring correction and that the said Letters Patent should read as corrected below.

Column 3, line 50, for "Mondur SH" read -- Mondur S --.

Signed and sealed this 29th day of October 1968.

(SEAL)
Attest:

Edward M. Fletcher, Jr.                                    EDWARD J. BRENNER

Attesting Officer                                                   Commissioner of Patents